US012392620B2

(12) United States Patent
Ravishankar et al.

(10) Patent No.: US 12,392,620 B2
(45) Date of Patent: Aug. 19, 2025

(54) SPEEDING UP STOCHASTIC ROUTING OF VEHICLES USING TIERING

(71) Applicant: The Regents of the University of California, Oakland, CA (US)

(72) Inventors: Chinya V. Ravishankar, Irvine, CA (US); Payas Rajan, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 68 days.

(21) Appl. No.: 18/237,136

(22) Filed: Aug. 23, 2023

(65) Prior Publication Data

US 2024/0068823 A1 Feb. 29, 2024

Related U.S. Application Data

(60) Provisional application No. 63/400,353, filed on Aug. 23, 2022.

(51) Int. Cl.
*G01C 21/34* (2006.01)

(52) U.S. Cl.
CPC ..... *G01C 21/3446* (2013.01); *G01C 21/3453* (2013.01)

(58) Field of Classification Search
None
See application file for complete search history.

(56) References Cited

U.S. PATENT DOCUMENTS

| 7,573,866 | B2 | 8/2009 | Nikolova | |
|---|---|---|---|---|
| 9,587,954 | B2 | 3/2017 | Gusikhin | |
| 10,309,795 | B2 | 6/2019 | König | |
| 10,535,256 | B1 | 1/2020 | Lim | |
| 11,435,199 | B2* | 9/2022 | Lermusiaux | G01C 21/3469 |
| 2008/0025222 | A1 | 1/2008 | Nikolova | |
| 2015/0241233 | A1* | 8/2015 | Loftus | G01C 21/3682 701/410 |
| 2021/0018322 | A1* | 1/2021 | Jiang | G06F 16/9024 |
| 2022/0146272 | A1* | 5/2022 | Verma | G01C 21/3446 |
| 2022/0205796 | A1* | 6/2022 | Wray | G01C 21/3407 |

(Continued)

OTHER PUBLICATIONS

Baum, Shortest Feasible Paths with Charging Stops for Battery Electric Vehicles (Year: 2019).*

(Continued)

*Primary Examiner* — Ryan Rink
(74) *Attorney, Agent, or Firm* — Perkins Coie LLP

(57) ABSTRACT

A vehicle path routing method is disclosed for determining a lowest-cost path from a source to a destination. A graph representing a road network includes vertices and edges between vertices. Vertices in the graph represent locations and edges represent paths between locations. Edge weights represent costs, such as travel times and energy consumptions for travel along edges of the graph. Significantly, edge weights are represented as probability distributions. The routing method partitions the edges into multiple tiers, for which convolutions of probability distributions can and cannot be feasibly replaced with functional approximations. A Dijkstra search of the graph from a vehicle origin to a vehicle destination computes, for vertices along a path, convolutions of distributions and sums of functional approximations.

20 Claims, 11 Drawing Sheets

(56) References Cited

U.S. PATENT DOCUMENTS

2022/0272029 A1\* 8/2022 Vasseur .................. H04L 45/24
2024/0094017 A1\* 3/2024 Baum ................ G01C 21/3697

OTHER PUBLICATIONS

Tiering in Contraction and Edge Hierarchies for Stochastic Route Planning. SIGSPATIAL '21: Proc. 29th Int'l Conf. on Advances in Geographic Information Systems Nov. 2021. p. 616-625.
Payas Rajan. Electric Vehicle Route Planning in the Presence of Stochasticity. PhD dissertation. Mar. 2022.

\* cited by examiner

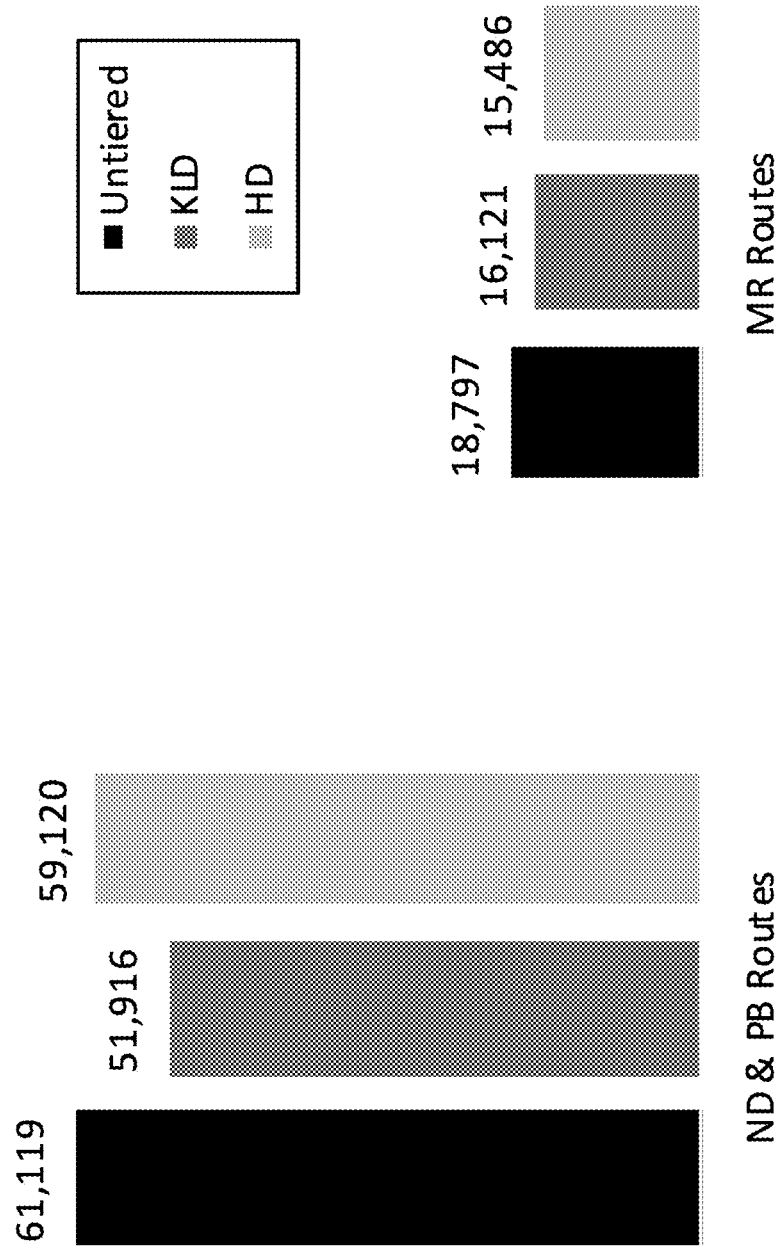

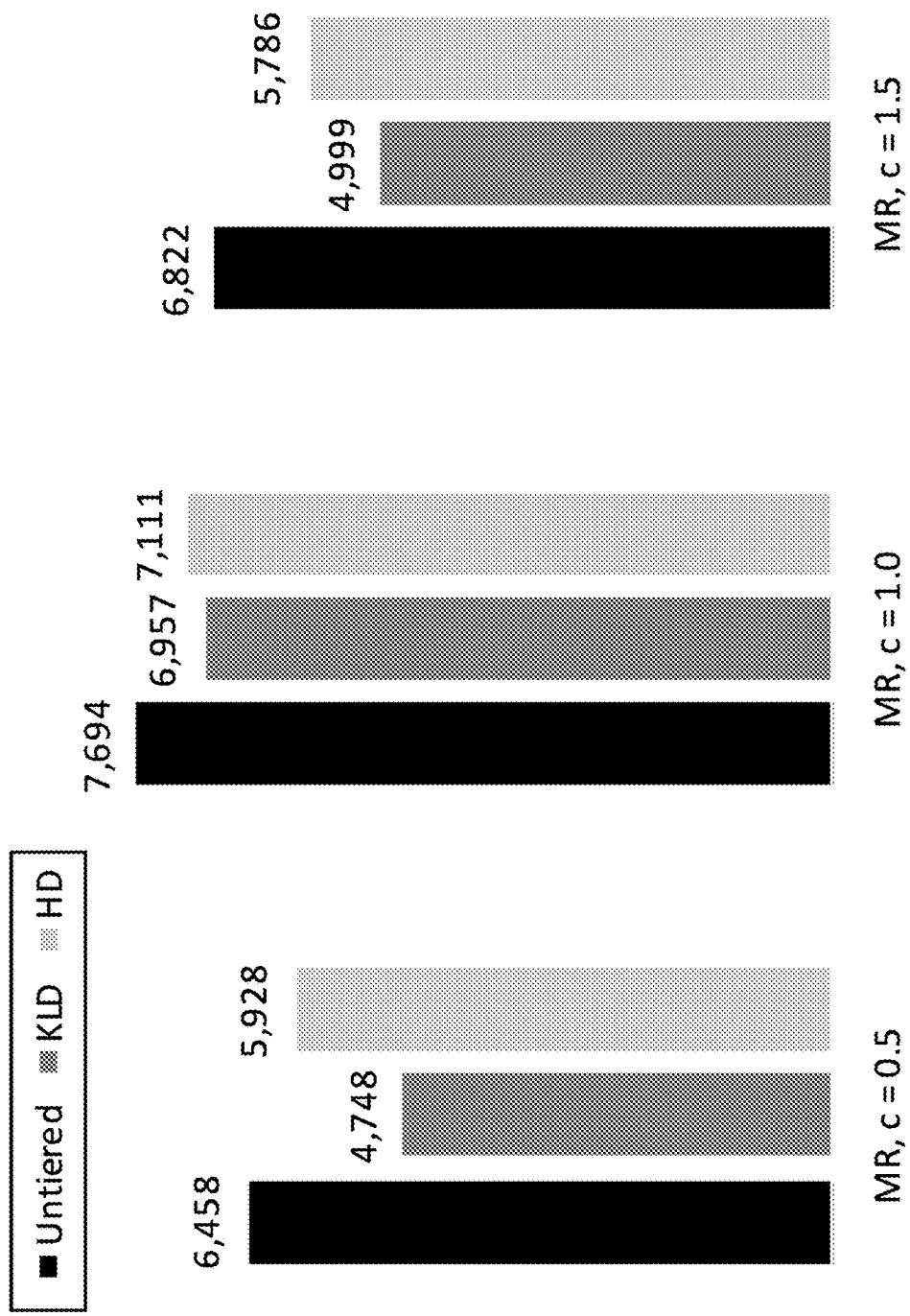

600 storing at a server a graph representing possible vehicle paths in a road network, the graph comprising vertices and edges between vertices, where the vertices represent locations in the road network, and wherein the edges represent road segments between the locations

602 processing the edges to add a set of shortcut edges that represent paths on the road network comprising a sequence of connected edges.

604 at the server, receiving over a communications network and storing edge weights representing travel times for travel along edges of the graph, where the edge weights are represented as probability distributions

606 partitioning the edges into multiple tiers, wherein a first tier has a first set of edges such that convolutions of probability distributions of the first set of edges can be feasibly replaced with functional approximations, and wherein a second tier has a second set of edges such that convolutions of probability distributions of the second set of edges can not be feasibly replaced with functional approximations

608 receiving over the communication network a vehicle origin and a vehicle destination

610 performing a Dijkstra search of the graph from the vehicle origin to the vehicle destination, wherein the Dijkstra search computes, for vertices along a path, convolutions of distributions and sums of functional approximations

612 returning over the communication network paths from the source to the destination produced by the Dijkstra search

*Fig. 6*

SPEEDING UP STOCHASTIC ROUTING OF VEHICLES USING TIERING

CROSS-REFERENCE TO RELATED APPLICATIONS

This application claims priority from U.S. Provisional Patent Application 63/400,353 filed Aug. 23, 2022, which is incorporated herein by reference.

STATEMENT REGARDING FEDERALLY SPONSORED RESEARCH OR DEVELOPMENT

This invention was made with Government support under contract IIS-1527984 awarded by the National Science Foundation. The Government has certain rights in the invention.

FIELD OF THE INVENTION

The present invention relates generally to methods for vehicle routing. More specifically, the invention relates to stochastic vehicle routing techniques in which costs of segments on routes are represented by probability distributions.

BACKGROUND OF THE INVENTION

For vehicle route planning, road networks have traditionally been modeled as graphs with deterministic edge weights representing travel times. In practice, however, no two vehicles traveling along the same road segment can be expected to take the exactly same amount of time. A more accurate model represents edge weights as stochastic quantities, drawn from discrete or continuous travel time distributions. Fixed edge weights yield unique shortest paths; but with stochastic edge weights, one can define shortest paths only in a probabilistic sense. The shortest path computation is also more complex, since edge weight distributions cannot be directly compared. Route planning with stochastic edge weights allows for several types of shortest path queries. Stochastic route planning is a much harder problem than its deterministic counterpart, due to the high cost of computing convolutions. With deterministic edge weights, routing is feasible in times on the order of microseconds on continental road networks. With stochastic edge weights, however, the best known routing methods, depending on the routing objective, take time on the order of seconds even on city-sized road networks. Even in restricted parameter settings, stochastic routing is only known to be feasible in time on the order of milliseconds, using speedup techniques for deterministic edge weight graphs.

Stochastic Route Planning

Stochastic route planning dates to as far back as 1968, with a Monte Carlo method to estimate the joint probability distribution of the shortest path in a graph with probabilistic edge weights. Recent work on stochastic routing can be categorized along several axes: i) path versus edge-centric routing algorithms, which use ii) static versus adaptive edge weights, which are represented as iii) discrete versus continuous distributions.

Path vs. edge-centric routing: Most work on both deterministic and stochastic routing is edge-centric, assigning to each edge in the routing graph weights or distributions, which are assumed to be independent. However, travel times along network edges are often correlated, so some approaches use paths instead of edges as the smallest unit for routing.

Static vs. adaptive edge weights: Some approaches model stochastic edge weights as static probability distributions given along with the routing graph. In this case, edge weights can be derived from given distributions by sampling, and we are to find the shortest path for a given definition of 'shortness'. In other problem definitions, such as the Stochastic On-Time Arrival (SOTA) and the Shortest Path problem considering On-time Arrival Reliability (SPOTAR) problems, the exact edge weight is 'revealed' only when the search reaches an adjacent vertex. Here, the problems seek an optimal policy for the driver to follow in order to have the highest probability of reaching the destination before deadline.

Discrete vs. continuous distributions: Edge weight distributions may be modeled as functions, or as histograms. Histograms discretize time, and are easy to create from spatiotemporal probe data, but perform well only with sufficient data. Functions are difficult to obtain, but do not depend on the availability of data. More recent attempts bridge this divide by combining the advantages of the two representations.

Speedup Techniques: CHS and EHs

Edge Hierarchies were introduced first as a speedup technique for deterministic routing, and are closely related to Contraction Hierarchies. Both techniques first assign ranks to all vertices or edges, and then apply the contraction operation per vertex or edge to add shortcut edges to the graph in the preprocessing stage. The query phase then consists of running slightly modified bidirectional Dijkstra's search, where both forward and backward searches only settle vertices (or relax edges) that are ranked higher than the source in forward search and the target in the backward search.

Contraction and Edge Hierarchies

Contraction Hierarchies (CHs) and Edge Hierarchies (EHs) are speedup techniques originally developed for deterministic route planning, and these find shortest paths in two stages. In the preprocessing stage, shortcut edges are added to the graph. In the query stage, shortcut edges help answer shortest path queries quickly. CHs and EHs are similar, and work as follows: given a road network modeled as a graph with travel times or distances as edge weights, each vertex (or edge) is first assigned a rank, and the contraction operation is applied to all vertices (or edges) in increasing rank order. Contracting a vertex (or an edge) adds a shortcut edge to the graph if it lies on the shortest path between two of its neighbor vertices (or edges). The query stage runs a bidirectional Dijkstra's algorithm from the source and target vertices, settling only vertices (relaxing only edges) with ranks higher than the source or target.

Handling Uncertain Edge Weights

CHs have been applied in uncertain settings, but no prior work exists on applying EHs in stochastic contexts. For deterministic routing, EHs have higher preprocessing costs since they apply the contraction operation per edge, thereby offering a finer grained hierarchy. They are also known to have worse query times than CHs. Nevertheless, EHs are more selective in relaxing edges in the query phase, and hold the promise of better performance when relaxing edges is computationally expensive. Finding stochastic shortest paths is one such application.

When edge weights are modeled as probability distributions, a major cost of finding shortest paths is computing edge weight convolutions. Edge weight distributions can be represented variously, and the choice of representation can significantly affect shortest path query times, as they involve various error, convolution cost, and space usage tradeoffs.

BRIEF SUMMARY OF THE INVENTION

In the context of vehicle routing algorithms, where costs of segments on routes are probability distributions, herein is disclosed a method of speeding up the computation of minimum-cost paths from a source to a destination for vehicles on a large road network. A key feature relates to determining which convolutions can and cannot feasibly be replaced with functional approximations (creating two tiers) and then replacing expensive convolutions with quick functional computations for one tier, speeding up computation of queries. Statistical tests are used to distinguish tiers. This technique reduces the computational cost for stochastic shortest path queries on realistic road networks by large factors, compared to existing approaches.

The Tiering Idea

We present a tiering technique for CHs and EHs, which works as follows: the set of shortcut edges in a CH or EH with uncertain weights is divided into a series of tiers, each of which uses an edge weight representation suitable for that tier. For instance, lower-ranked shortcut edges are likely to connect local vertices, with travel time distributions that do not resemble standard distributions. Histograms represent arbitrary distributions well, and are likely to be better representations here. However, higher ranked shortcuts in the CH or EH connect vertices farther away, and represent travel over many graph edges. Their edge weight distributions are convolutions over multiple distributions, and likely to converge to stable distributions, such as the Gaussian. When edge weight distributions resemble Gaussians (as measured by the KL divergence or Hellinger distance), representing them as Gaussians offers fast convolutions, and is accurate and compact.

We apply tiering to both EHs and CHs, and present Uncertain Contraction Hierarchies (UCHs) and Uncertain Edge Hierarchies (UEHs), whose edge weights represent stochastic travel times. Given a graph $G=(V, E)$, a source s E V and destination t∈V, we study UCHs and UEHs for three types of stochastic routing queries:
1. Non-Dominated Routes: Find s-t routes that have edge weight distributions not dominated by other routes.
2. Probabilistic budget routes: Find a route that maximises the probability of travel cost being within a given budget b.
3. Mean-risk routes: Given a risk aversion coefficient $c \geq 0$, find routes minimizing (mean travel time+c* $\sqrt{\text{variance}}$).

We show that when coupled with proper heuristics, tiered UCHs and UEHs offer faster stochastic routing queries than their non-tiered variants for all three query types. Further, we build the UEH and UCH using both KL divergence and Hellinger distance measures. These similarity measures offer different tradeoffs: KL divergence yields faster queries, while Hellinger distance permits theoretical bounds on the approximation errors in the shortest path queries.

Finally, contrary to findings in current literature, we show that for all three query types considered, UEHs can have query times comparable to UCHs. UEHs still require higher preprocessing times, since although the query algorithms for both EH and CH are very similar, EHs relax fewer edges due to their finer grained hierarchy, but CHs offer far better stalling performance.

In one aspect, the invention provides a vehicle path routing method for determining a lowest-cost path from a source to a destination, the method comprising: storing at a server a graph representing a road network, the graph comprising vertices and edges between vertices, where the vertices represent locations in the road network, and wherein the edges represent road segments between the locations; at the server, augmenting the graph representing the road network by adding shortcut edges to the edges, wherein the shortcut edges represent paths comprising a sequence of connected edges in the graph representing the road network; at the server, receiving over a communications network and storing edge weights representing travel times for travel along edges of the graph, where the edge weights are represented as probability distributions; partitioning the edges of the augmented graph into multiple tiers including an upper tier and a lower tier, wherein the upper tier has a first set of edges whose weights are specified as stable distributions and/or wherein convolutions of probability distributions of the first set of edges can be feasibly replaced with functional approximations, and wherein the lower tier has a second set of edges wherein convolutions of probability distributions of the second set of edges cannot be feasibly replaced with functional approximations; receiving over the communication network a vehicle origin and a vehicle destination and other relevant vehicle parameters; performing a Dijkstra search on the augmented graph from the vehicle origin to the vehicle destination, wherein the Dijkstra search computes convolutions of distributions and sums of functional approximations for paths being computed; and returning over the communication network paths from the source to the destination produced by the Dijkstra search.

Preferably, partitioning the edges into multiple tiers comprises ranking the shortcut edges, and partitioning the edges based on the ranking.

The multiple tiers may comprise a tier having edge weights that are stable distributions, such as Gaussian distributions. The multiple tiers may comprise a tier having edge weights that are non-stable distributions, such as histograms.

Preferably, partitioning the edges of the augmented graph into multiple tiers comprises performing statistical tests to determine whether a functional approximation in terms of a stable distribution is feasible for an edge weight, and of aggregating stable distributions for paths, including shortcut paths, during shortest path computation.

The paths may comprise a path maximizing a probability of reaching the destination before a deadline. The paths may comprise a path minimizing a linear combination of the mean and variance of travel times on edges. The paths may comprise a path that has cost distributions not stochastically dominated by other routes in the network.

BRIEF DESCRIPTION OF THE SEVERAL VIEWS OF THE DRAWINGS

FIGS. 4A-4B are bar graphs showing preprocessing times for the tiered and untiered uncertain EHs (FIG. 4A) and CHs (FIG. 4B) on the contracted Tile 0230123 road network.

FIGS. 5A-5D are bar graphs showing query times for all three query types, using the tiered and untiered uncertain CHs and EHs on the contracted road network for Tile 0230123.

FIG. 6 is a flowchart providing an overview of the method for determining a vehicle route through a road network from a source to a destination, according to an embodiment of the invention.

DETAILED DESCRIPTION OF THE INVENTION

Figure 1:
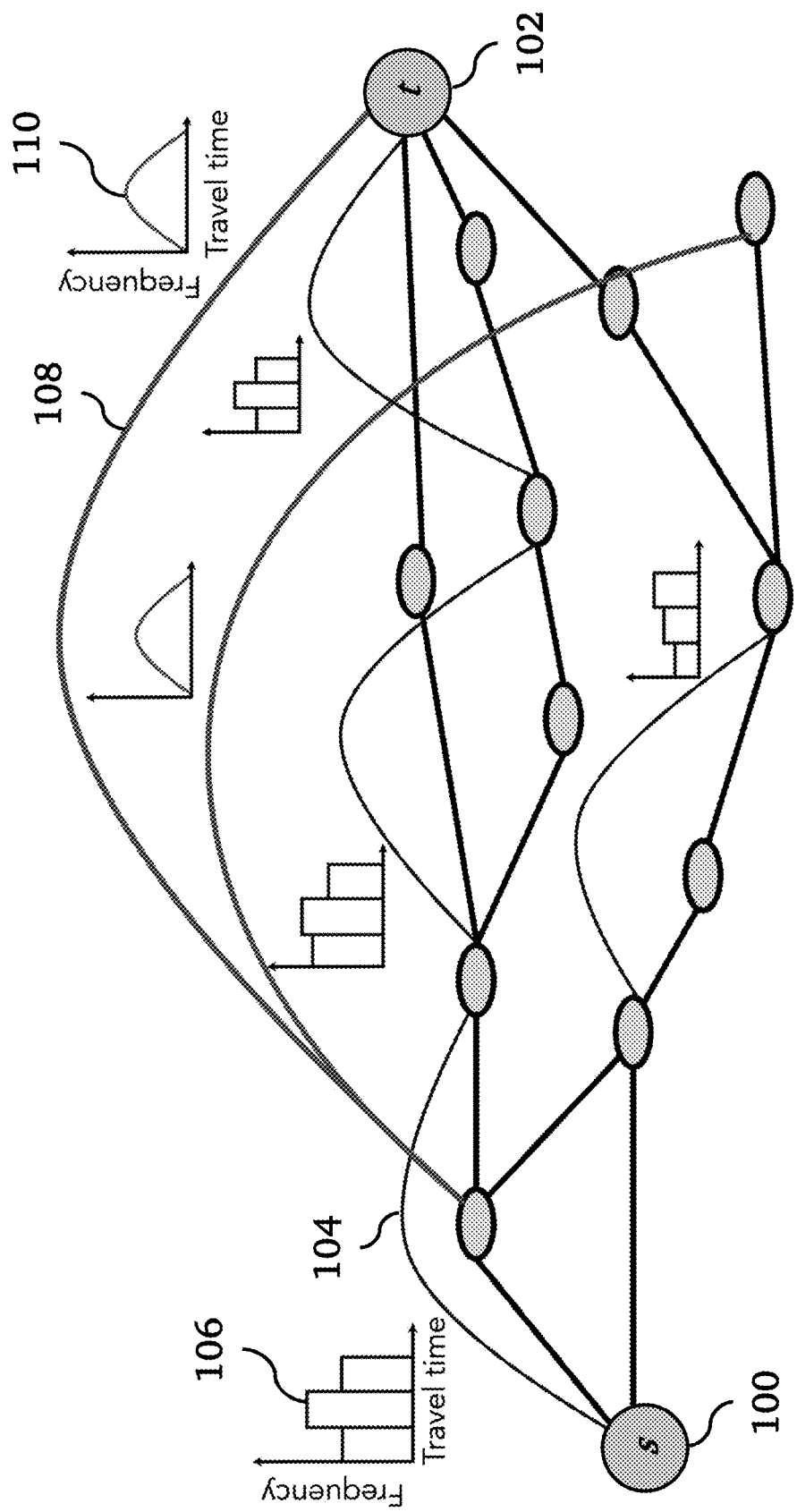
FIG. 1 is an illustration of a road network graph, where nodes represent locations and edges represent paths between locations, where the edges are provided with edge-weight distributions. Histograms are better lower hierarchy levels, as edge-weight distributions can be complex. Edge weights for shortcuts at higher levels are convolutions, which converge to Gaussians, which are compact, fast, and accurate.

A vehicle traveling on a road network incurs costs, such as travel time, energy consumed, or distance travelled. Obtaining lowest-cost source-destination routes (also called "shortest paths") is an important problem, especially for electric vehicles, which have limited battery capacities. Costs are first obtained for the low-level units constituting the path (road segments, say, or pathlets), and aggregated to get the cost for the entire path from source to destination.

The present invention provides a method of speeding up the computation of minimum-cost paths from a source to a destination for vehicles on a large road network. Current methods work well when these costs are fixed for each of the low-level units constituting the path. In this case, the cost for a path is simply the sum of the costs for the units forming the path.

In practice, however, the unit costs (travel time, say) are never constant, and will differ for each traversal of that unit. That is, real-life costs are probabilistic or stochastic, and must be described as a probability distribution of costs for that unit. Path costs are also distributions now. They are no longer just the sums of unit costs, but are convolutions over the cost distributions for the individual units. Shortest paths under these conditions are called stochastic shortest paths.

Stochastic shortest-path computations can be orders of magnitude slower than for fixed-cost case, since convolutions can be very expensive. Our invention speeds up stochastic shortest path queries on road networks with stochastic costs, which have been augmented with a hierarchy-based speed up techniques, such as contraction hierarchies, which add shortcuts to the original graph representing the road network.

Embodiments of the present invention allow the replacement of expensive convolutions with quick functional computations, especially for long paths, resulting in huge speedups. The hierarchy of shortcuts is divided into two (or more) tiers, with the functional approximation applied to the upper tier, and convolutions used in the lower tier. We use statistical tests to determine when such a functional approximation is feasible, and provide some bounds on the resulting errors. In one implementation, a second tier is Gaussian. In other implementations, however, depending on the edge distributions, there may be room for multiple ways of approximating the results of convolutions (e.g., different stable distributions may work better for different aggregated paths).

We have applied our methods to three types of shortest-path computations: paths maximizing the probability of reaching the destination before a given deadline, paths minimizing a linear combination of the mean and variance of travel times on edges, and paths that have cost distributions not stochastically dominated by other routes in the network.

Let the given graph be $G=(V, E)$, where V is the set of vertices and E is the set of edges. Each edge $e \in E$ is assigned a probability distribution W(e) representing the edge weight of e. Note that the edge weight may represent any stochastic quantity, such as travel times or energy consumptions, and may have an arbitrary distribution. The distribution may be represented as either a histogram, or a well-known distribution such as a Gaussian or a Beta distribution. The total cost of an s-t path $P=[s=e_1, e_2 \ldots, e_n=t]$ in G can then be computed as a convolution of the edge weights along P, and is given by $cost(P)=*_{e \in P} W(e)$.

Then, the stochastic shortest path queries may be defined in the following ways:

Non-dominated routing query—Return the full set of paths from s to t that are not stochastically dominated by other s-t paths.

Probabilistic budget routing query—Return at least one s-t path that maximizes the probability of reaching t with incurred cost below a given constraint d.

Mean-risk routing query—Given a non-zero risk aversion coefficient c, find a route that maximizes meantraveltime+c+√variance.

Standard hierarchy-based speed up techniques like the Contraction or Edge Hierarchies were developed for speeding up deterministic shortest path queries on large graphs, but have recently been extended to the case of stochastic edge weights. They operate by first preprocessing the large graph to add auxiliary edges or compute more information about the vertices so that the shortest path queries can be run much faster in the query stage. More precisely, they work as follows—In a given road network modeled as a graph with real-valued edge weights, each vertex (or edge) is first assigned a rank, and the contraction operation is applied to all vertices (or edges) in increasing rank order. Contracting a vertex (or an edge) adds a shortcut edge to the graph if it lies on the shortest path between two of its neighbor vertices (or edges). The query stage runs a bidirectional Dijkstra's algorithm from the source and target vertices, settling only vertices (or relaxing only edges) with ranks higher than the source or target. Recent extensions to contraction hierarchies for stochastic edge weights work analogously to the case of deterministic edge weights.

Our main contribution is the tiering technique, which can be used to answer the stochastic shortest path queries quickly on large graphs that have been augmented with shortcut edges. The basic idea behind tiering is to use the most appropriate edge weight representation for different edges in the augmented graph. The choice of edge weight representation is made so as to find the right balance between i) the accuracy ii) cost of convolutions, and iii) space efficiency. For instance, it is better to use histograms at the lower levels of the shortcut hierarchy, as they can represent arbitrary distributions and be space-efficient, whereas it is better to represent costs as stable distributions, such as the Gaussian distribution at the higher levels of the hierarchy, as they have a much lower computational cost of convolution, and can help answer stochastic shortest path queries much faster.

FIG. 1 is an illustration of a road network graph including nodes representing locations and edges representing paths between locations. A route in the graph is a sequence of vertices between a source node 100 and target node 102. Edges in the network graph are provided with edge-weights. For example, edge 104 has an edge-weight represented as a histogram 106, and edge 108 has an edge-weight represented as a Gaussian distribution 110. Histograms are better lower hierarchy levels, as edge-weight distributions can be complex. Edge weights for shortcuts at higher levels are convolutions, which converge to Gaussians, which are compact, fast, and accurate.

Using tiering, the hierarchy of shortcuts added to the given road network can be divided into tiers, where each tier uses a certain type of edge weight representation for edges in that tier. To determine the boundary edges between tiers, we use the following statistical test: While contracting a vertex or an edge, if the shortcuts being added to the graph are sufficiently similar to a stable distribution such as a Gaussian, we switch the edge weight representation of the added shortcut edges to a stable distribution, and store only the parameters of the fitted stable distribution. The similarity between a histogram and a stable distribution can be measured by using any standard similarity measure, e.g., the Kullback-Leibler Divergence or the Hellinger Distance, and the stable distribution can be fit to a given histogram using any standard fitting method. In the query stage, a stochastic variant of the bidirectional Dijkstra's algorithm can be run between the source and destination.

Problem Setup

We are given a graph $G=(V, E)$, where V is the set of vertices and $E \subseteq V \times V$ is the set of edges, and a stochastic edge weight function $W: E \to R$ mapping each edge e to a random variable $R_e \geq 0$. A path is a sequence of vertices $[v_0, v_1, \ldots, v_n]$ where $(v_i, v_{i+1}) \in E$. An s-t path is a path $[s=v_0, v_1, \ldots, v_n=t]$ between s and t.

The cost of path P is the aggregation of all stochastic edge weights along P, and is denoted cost(P). For path $P=[e_1, e_2 \ldots e_k]$, with weight distributions $W(e_1), W(e_2), \ldots, W(e_k)$, we obtain the aggregate distribution along P using the convolution $\circledast_{i=1}^{k} W(e_i)$.

We assume that the edge weights satisfy the First-In-First-Out (FIFO) property. This 'no overtake' rule guarantees that vehicles using the same path complete the trip in the same order that they started it. We are interested in three types of stochastic routing queries: probabilistic budget routing, non-dominated routes, and routes that optimize the mean-risk objective.

In probabilistic budget routing, we are given a source $s \in V$, a target $t \in V$ and a cost budget $b \geq 0$. We are to find an s-t path P that maximizes the probability that cost(P)≤b. The standard example of such a route would be a driver trying to reach an airport before a deadline b, which is the budget. We want a route that maximizes the probability of reaching the airport before the deadline b.

Non-dominated routing or Pareto-optimal routing seeks the full set of paths between source and destination vertices that are not dominated by other paths. A path P is said to dominate another path P' if the travel times for P are always lower than that for P'.

The mean-risk objective minimizes a linear combination of the mean and standard deviation of edge weights along the path. A typical application is to model travel time delays along a path. We have a graph $G=(V, E)$ and two edge weight functions $\mu: E \to R_{\geq 0}$ and $\tau: E \to RR_{\geq 0}$ that map every edge e to the mean $\mu_e$ and variance $\tau_e$ of travel time delay for each $e \in E$, a source $s \in V$, a target $t \in V$, and a risk-aversion coefficient $c \geq 0$. Our objective is to find an s-t path P that minimizes $\Sigma_{e \in P}(\mu_e + c\sqrt{\tau_e})$. A quasi-linear shortest-path algorithm under the mean-risk model approximates the convex hull of the level set of feasible solutions using linear separation oracles without restricting c. However, by restricting c, sub-linear query times may be achieved by applying distance oracles to speed up queries.

Uncertain Hierarchies

Three major factors affect the performance of speedup techniques beyond low-level optimizations: the structure of the road network, the available 'hierarchy' in edge weights that can be exploited by adding shortcuts to the graph, and the runtime cost of basic operations required to compute edge weights. For instance, CHs are known to perform well for graphs with a low road or skeleton dimension, and perform much better if travel times are used as edge weights, rather than physical distances between the vertices. Further, the cost of operations required on edge weights is a significant component of the algorithm engineering required for data structures such as the Time-dependent Uncertain Contraction Hierarchies. Our goal in this section is to develop Uncertain Contraction and Edge Hierarchies for stochastic routing.

Tiering in Hierarchies

Travel-time distributions are often derived from collected trajectory data or other traffic sensors. Broadly, there are two ways to represent uncertain edge weights: using histograms or using continuous functions. Speed-up techniques for graphs with uncertain edge weights benefit greatly if the edge weight representations have the following properties:

1. Accuracy: The representation should capture all the information about the edge cost distribution without errors.
2. Cheap convolutions: Convolution is a basic operation in finding shortest paths, so representations that offer cheaper convolutions can improve query performance.
3. Space efficiency: Compact edge weight representations can have improve cache performance, reducing query times.

Histograms and continuous distributions make different tradeoffs between these properties. Most real-world data is collected by periodic, not continuous sampling, so histograms are usually the most accurate representations of available information. However, the source distributions can be complex, so histogram convolutions can be expensive. In contrast, convolutions are very fast when edge weights match stable distributions such as the Gaussian.

Given two Gaussians $F = \mathcal{N}(\mu_1, \sigma_1^2)$ and $G = \mathcal{N}(\mu_2, \sigma_2^2)$, we have $F \circledast G = \mathcal{N}(\mu_1+\mu_2, \sigma_1^2+\sigma_2^2)$, so convolution is just two additions. More complex representations, like Gaussian Mixture Models, can be less compact and have high convolution costs.

Definition 1 A tier T in a CH or EH is the set of shortcut edges with ranks $\tau_{min}^T \leq r(e) < \tau_{max}^T$ for given thresholds $\tau_{min}^T$ and $\tau_{max}^T$.

A tier T is marked as a histogram tier or a function tier depending on whether histograms or continuous functions are used to represent the edge weights in T. In a histogram tier, a histogram with a fixed bucket width w and b buckets is used to represent edge weights. Similarly, edge weights in a function tier are represented by a mixture of one or more stable probability distributions. (A stable probability distribution is one such that the linear combination of two or more random variables with the distribution results in the same distribution with different parameters.)

Definition 2 A tiered contraction or edge hierarchy is a series of tiers $[T_1, T_2, \ldots T_N]$ such that $\tau_{min}^{T_{(i+1)}} = \tau_{max}^{T_i} + 1$, $i=1, \ldots, N$.

The next problem is to choose the number and type of tiers for the hierarchy. We use the following useful heuristic: edges with weights derived from a large number of convolutions are likely to have distributions that approximate the Gaussian. Using this heuristic, we use a two-tiered contraction or edge hierarchy, which contains a histogram tier H with thresholds $\tau_{min}^H$ and $T_{max}^H$, and a Gaussian tier G with thresholds $\tau_{min}^G$ and $\tau_{max}^G$ that uses Gaussian edge weights in G.

A heuristic for pruning Dijkstra's search has been used previously. However, an important difference is that we use the Central Limit Theorem to alter the structure of the contraction or edge hierarchy while building the hierarchies, while previous techniques use the heuristic in the query stage. Also, we do not consider time-varying edge weights.

We model Uncertain Edge Hierarchies (UEHs) as two-tiered hierarchies with Histogram and Gaussian tiers. We now show their construction and use to answer the three types of stochastic routing queries under consideration.

Preprocessing

All edges in G are ranked in rounds. We iterate over unranked edges, and compute the number of edges that would be added to G if they were ranked in this round. Then, we pick a set of edges that would add the minimum number of edges among their neighbor edges and add them to the ranking set R in increasing order. We then rank edges in R in the current round.

Let r(u, v) denote the rank of edge (u, v). In a round, on every iteration, an unranked edge (u, v) is picked, and the contraction operation applied to it as follows: a Dijkstra's run is used to determine if (u, v) lies on the shortest path between any unranked edges (u', u) and (v, v'). If it does, shortcut edges (u, v') and (u', v) are added to a set S. Next, the algorithm computes a minimum vertex cover of the bipartite graph in S. The edges adjacent to vertices that remain after the minimum vertex cover computation over S are then added to G and (u, v) is removed.

Figure 2:
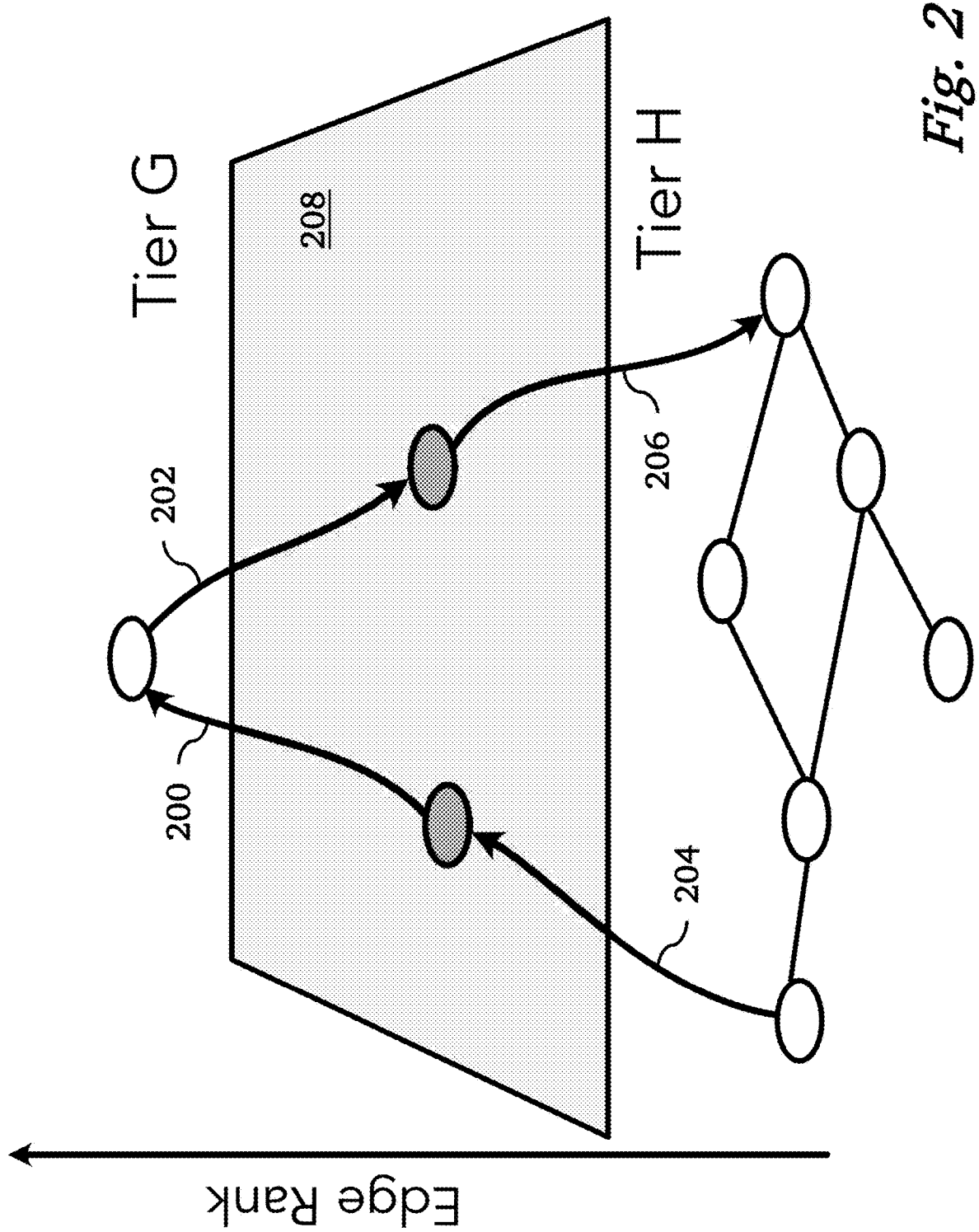
FIG. 2 is a schematic diagram of a road network graph, illustrating the partitioning of graph edges into different tiers, where edge-weight distributions are represented differently in distinct tiers.

FIG. 2 is a schematic diagram of a road network graph, illustrating tiering in shortcut hierarchies. In this example network, edges 200 and 202 are in Tier G, while edges 204 and 206 are in Tier H. The plane 208 illustrates the division between the two tiers. Edge-weight distributions are represented as histograms in Tier H, and as Gaussian approximations in Tier G.

Uncertain Edge Hierarchies
Determining the Tier Thresholds

We must next find suitable thresholds for the histogram tier H and the Gaussian tier G of the UEH. Since H is the lower tier, $\tau_{min}^H = 1$.

We find $\tau_{min}^G$ as follows. Since the number of edges is very large, we use sampling, and examine only one in $\lambda$ edges. Let e be a sampled edge with edge weight histogram W(e). We first construct a Gaussian distribution $\mathcal{N}(\mu_e, \sigma_e^2)$ from W(e). We next sample this Gaussian and construct a histogram G(e). Finally, we compute the KL divergence (or Hellinger distance) between G(e) and W(e) for the shortcut edges e being added. Given two discrete distributions G, W on a probability space $\chi$, $$D_{KL}(W \| G) = \sum_{x \in \chi} W(x) \log \frac{W(x)}{G(x)}.$$

If the KL-divergence is less than a predetermined similarity threshold $\sigma_T$ for all the edges to be added, we set $\tau_{min}^G = \lambda$ and $\tau_{max}^H = \lambda - 1$. Algorithm 1 shows the pseudocode for building UEHs. The preprocessing phases for UEHs built using both KL divergence and Bellinger distance measures are identical, except for the use of different measures on Line 17 of Algorithm 1.

The sampling frequency A and similarity threshold $\sigma_T$ are UEH configuration parameters. $\lambda$ depends on the number of edges in the EH, so $1 \leq \lambda \leq |E|$. The parameter $\lambda$ presents a tradeoff between preprocessing times and query times. Similarly, $\sigma_T$ trades off the accuracy for query times. A low A means that we check for threshold of tiers H and G more often while building the UEH, possibly lowering query times but raising preprocessing costs. Conversely, setting $\lambda$ too high would put more edges in tier H than strictly required, offsetting the benefits of cheaper convolutions in tier G. On the other hand, setting a high $\sigma_T$ means we approximate edge weight histograms with Gaussian distributions even when the two differ significantly, reducing query accuracy. Finally, setting $\sigma_T$ too low slows down queries as the UEH contains mostly edge weight histograms, for which convolutions are expensive.

Stochastic Query Processing

Since each edge is assigned an integer rank, as in the deterministic EH, there exists an up-down path between source $s \in V$ and target $t \in V$. For every vertex in G, the The search algorithm is a bidirectional Dijkstra's run from s and t, which first sets the vertex rank labels at s and t to 0. Then, search in both directions expands only edges with rank greater than the rank label of v after reaching vertex v. If the distance of a vertex v from source is updated in the priority queue while relaxing edge (u, v), rank label of u is set to r(u, v). Since UEHs have edge weights represented as either histograms or continuous functions in different tiers, as the search progresses, it may relax edges from one or both tiers H and G. Whenever a Dijkstra's search starting from tier $T \in \{H, G\}$ reaches some edge $e \notin T$, we call e a boundary edge.

Algorithm 1 Building the two-level Uncertain Edge Hierarchy

```
1:  procedure BUILDEDGEHIERARCHY
2:      current Rank ← 0
3:      Set current tier to H
4:      while unranked edges remain in G do
5:          Pick unranked edge (u, v); r(u, v) ← current Rank
6:          for unranked (u', u) do
7:              for unranked (v, v') do
8:                  if (u, v) lies on shortest path from u' to v' then
9:                      S ← S ∪ {(u', u), (v, v')}
10:                 end if
11:             end for
12:         end for
13:         MVC(S) ← Bipartite Minimum Vertex Cover over S
14:         if current Rank is a multiple of λ then
15:             for e ∈ MVC(S) do
16:                 𝒩 (μₑ, v²ₑ) ← Gaussian approximation of W(e)
17:                 KL ← KLU {D_{KL}[W(e) ‖ 𝒩 (μₑ, v²ₑ)}
18:             end for
19:             if all edges in KL have similarity < σ_T then
20:                 Set current tier to G
21:             end if
22:         end if
23:         Add edges in MVC(S) to current tier
24:         current Rank ← current Rank + 1
25:     end while
26: end procedure
```

Lemma 1 A shortest path between any two vertices s and t in a UEH can contain at most two boundary edges.

Proof 1 Since all shortest paths in a UEH are up-down paths, let $P=[s=v_1, v_2, \ldots, v_n=t]$ be a shortest path such that $r((v_i,v_{i+1}))<r((v_{i+1},v_{i+2}))$ for $1\leq i<m$, and $r((v_j,v^{j+1}))>r((v_{j+1}, v^{j+2}))$ for $m\leq j\leq n$. Only one of two cases can arise.

First, if rank $r((v_{m-1}, v_m))$, $<\tau_{min}^G$, all edges in P lie in tier H, and P has no boundary edges. Second, if $r((v_{m-1}, v_m))\geq\tau_{min}^G$, we must have i, $j\in[1, n]$ such that $r((v_i,v_{i+1}))\leq\tau_{min}^G\leq r((v_{i+1},v_{i+2}))$, and $r((v_j,v_{j+1}))\geq\tau_{min}^G\geq r((v_{j+1}, v_{j+2}))$. Then, $(v_{i+1},v_{i+2})$ and $(v_{j+1},v_{j+2})$ are the two boundary edges in P.

Error Bounds for KL Divergence

In a UEH, the weight of a shortcut edge e is the convolution of all edge weight distributions that the shortcut replaces. However, if e lies in tier G, we store only a Gaussian approximation of the exact distribution such that the maximum KL divergence between the two is $\sigma_T$. The maximum error this approximation induces for an edge weight is given by Pinsker's inequality:

$$\|W(e) - \mathcal{N}(\mu_e, v_e^2)\|_1 \leq \sqrt{2\sigma_T}, \text{ where}$$

$$\|W(e) - \mathcal{N}(\mu_e, v_e^2)\|_1 = \sup\{|W(e)(x) - \mathcal{N}(\mu_e, v_e^2)(x)|, x\in \mathbb{R}\} \quad (1)$$

Here, $\|W(e) - \mathcal{N}(\mu_e, v_e^2)\|_1$ is the $L_1$ distance between the exact edge weight distribution of edge e, W(e) and $\mathcal{N}(\mu_e, v_e^2)$ its Gaussian approximation. The $L_1$ distance is the maximum difference between two values for any observation $x\in \mathbb{R}$ for which they are defined.

As longer shortcuts are added to the UEH at higher levels, we can determine the rate at which the edge weight distributions converge to Gaussians. Using Lemma 1, an s-t shortest path P can be divided into a sequence of three subpaths $[P_H, P_G, P_{H'}]$ where $P_H$ and $P_{H'}$ lie in tier H and $P_G$ lies in tier G. The edge weights in $P_H$ and $P_{H'}$ are exact histograms that induce no error, while those in $P_G$ use approximations with Gaussian distributions. Let s(e) represent the edges in G that each shortcut edge $e\in P_G$ replaces. Then, the total number of "unpacked" edges in $P_G$ is $\Sigma_{e\in P_G}s(e)$.

The rate at which convolutions of edge weights in $P_G$ converge to a Gaussian distribution is given by the Berry-Esseen theorem. Let $X_1, X_2, \ldots, X_n$ be independent random variables with $E[X_i]=0$, $E[X_i^2]=\sigma_i^2>0$, $E[|X_i|]^3=\rho<\infty$. Let $F_n$ be the CDF of $S_n=(\Sigma_{i=1}^n X_i)/\sqrt{\Sigma_{i=1}^n \sigma_i^2}$. Now, $$\sup_{x\in\mathbb{R}} |F_n(x) - \Phi(x)| \leq C_0 \left(\sum_{i=1}^n \sigma_i^2\right)^{-\frac{3}{2}} \sum_{i=1}^n \rho_i, \quad (2)$$

where $\Phi(x)$ is the standard Gaussian, and $0.4097\leq C_0\leq 0.56$. Equation 2 can be used to get the rate of convergence and error in a shortest path query only after all the edges along the shortest path from s to t are known.

Using the Hellinger Distance

An alternative approach to the UEH would be to use the Hellinger Distance (HD) instead of KL-Divergence for constructing the hierarchy. For discrete probability distributions $P=\{P_1, P_2, \ldots, P_k\}$ and $Q=\{Q_1, Q_2, \ldots, Q_k\}$, the Hellinger distance is given by:

$$H(P, Q) = \frac{1}{\sqrt{2}} \sqrt{\sum_{i=1}^k (\sqrt{P_i} - \sqrt{Q_i})^2}$$

Unlike KL Divergence, HD satisfies the triangle inequality, which can be used to reduce the approximation error by storing the HD in each edge weight in tier G, and including it in the dominance criterion in the query phase. Each stochastic routing query then returns the pareto-optimal set of routes with two objectives: to minimize the distance from s to t, and to minimize the approximation error. We call this variant of UEHs the HD-UEH, and the originally introduced version the KLD-UEH.

Query Processing Details

We now consider the three types of queries described in Section.

Figure 3:
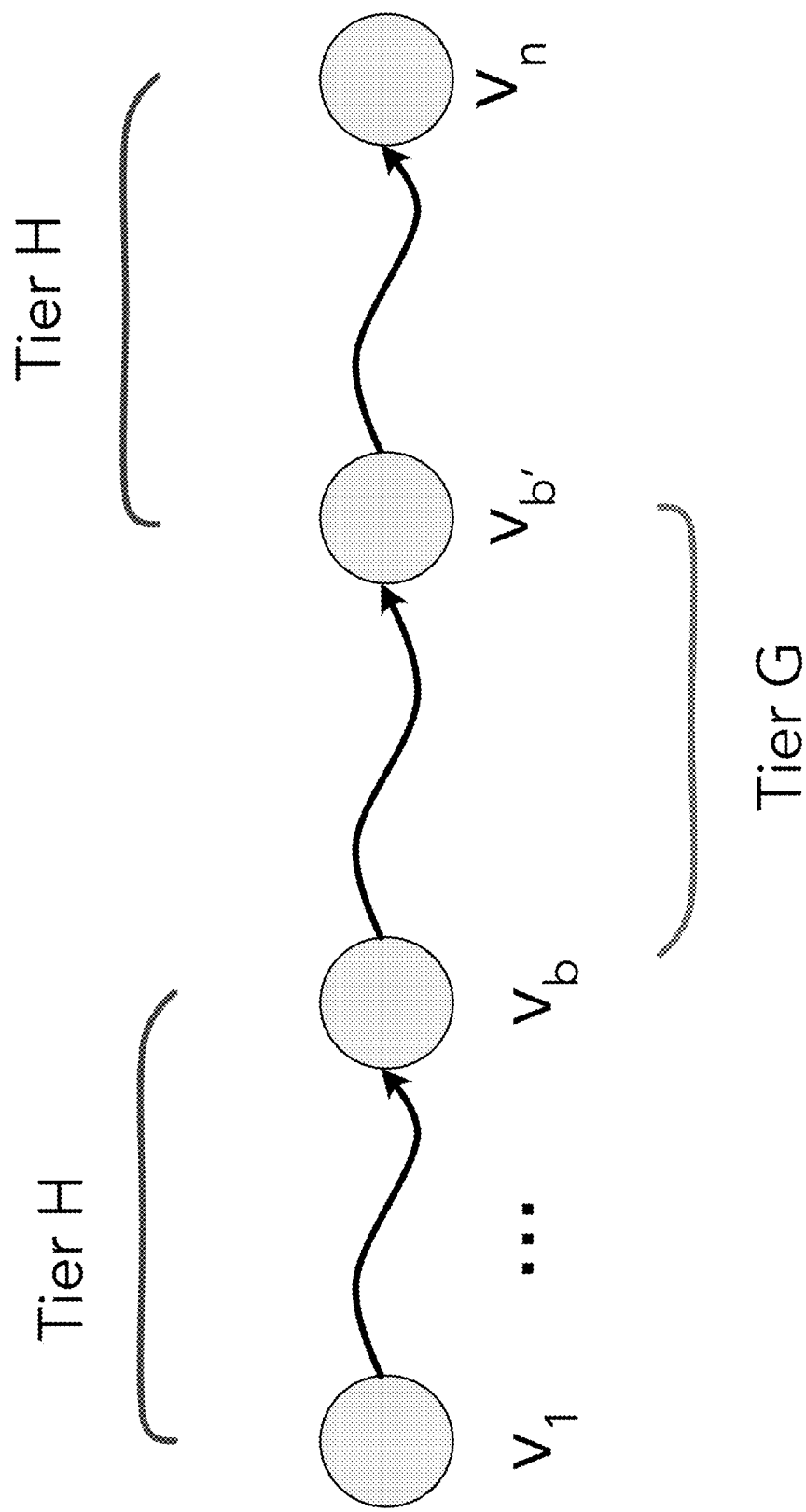
FIG. 3 is a schematic diagram of a path in a road network graph along a sequence of vertices, where the path includes edges in different tiers.

(1) Non-dominated routes: To find non-dominated routes, we maintain two label sets at all vertices. At $v\in V$, $L_{un}(v)$ and $L_{set}(v)$ respectively store the unsettled and settled labels for a Dijkstra search. Before each query, all sets are emptied. A bidirectional Dijkstra search starts from source s and target t, setting $r(s)=r(t)=0$. On reaching vertex v, a Dijkstra label $\ell_v = (\text{dist}(v), \xi_v)$ is added to $L_{un}(v)$, where dist(v) represents the convolution of all edge weights on the current path from s to v, and $\xi_v$ is the error term. In HD-UEHs, when the search reaches a vertex u, on relaxing edge (u, v), we set $\xi_v=\xi_u+$ HD(u, v). Since HD satisfies the triangle inequality, HD(s, v)<HD(s, u)+HD(u, v). However, KL divergences do not satisfy the triangle inequality, and can not be added directly to give error bounds when using KLD-UEH. Therefore, we set $\xi_v$ to a null value, and exclude it from Dijkstra's search labels. This is illustrated in FIG. 3, which is a schematic diagram of a path in a road network graph along a sequence of vertices, $v_1, \ldots, v_n$, where the path includes edges from vertices $v_1, \ldots, v_b$ in tier H, edges from vertices $v_b, \ldots, v_{b'}$ in tier G, and edges from vertices $v_{b'}, \ldots, v_n$ in tier H. Computing approximation error on this path in UEH, Gaussian approximations are used only on the tier-G subpath. When this subpath is known, KLD-UEH uses Pinsker's inequality (Equation 1) to find the total error, while HD-UEH propagates the error term in Dijkstra's search labels.

We bound the approximation error in an HD-UEH as follows: Assume that $P=[s=v_1, \ldots, v_b, v_{b+1}, \ldots, v_{b'}, v_{b'+1}, \ldots, v_n=t]$ is a shortest path, where $(v_b, v_{b+1})$ and $(v_{b'}, v_{b'+1})$ are the boundary edges. P comprises of three subpaths $S=[v_1, \ldots, v_b]$, $S'=[v_{b+1}, \ldots, v_{b'}]$ and $S''=[v_{b'+1}, \ldots, v_n]$, where S and S" lie in tier H, and S' lies entirely in tier G. Only S' induces approximation error in P. We can then quantify the error in S' as follows: Assume that a Dijkstra search starts from $v_b$ and reaches $v_{b'}$, spawning a label $\ell'$ at $v_{b'}$. Let $\xi_{b'}\in \ell'$ be the error term in label $\ell'$. Let $C_{S'}$ be the convolution of the edge weight histograms along the path, so $C_{S'} = \circledast_{e\in S'} W(e)$. Let $\text{cost}_{S'}$ be the convolution of the Gaussian approximations along the path. Then, $\xi_{b'}$ is an upper bound on the Hellinger distance between $\text{cost}_{S'}$ and $C_{S'}$. By the definition of Hellinger distance, $$\xi_{b'} > \frac{1}{\sqrt{2}} \|\text{cost}_{S'} - C_{S'}\|_2$$

To compute non-dominated routes, the Dijkstra search terminates when the priority queue becomes empty, not when it reaches t.

(2) Probabilistic budget routes A Probabilistic Budget Route query runs exactly like a non-dominated route query, except for an additional pruning criterion: on relaxing an edge (u, v), we compare the distance from the s to v with b. The search is terminated if reaches a vertex with distance from source greater than b.

(3) Minimizing the mean-risk objective We adapt a previous approach, which creates a set K of distance oracles with deterministic edge weights to $\epsilon$-approximately answer shortest path queries that minimize the mean-risk objective. In the original settings, for each $e \in E$, $W(e) = \mathcal{N}(\mu_e, \tau_e^2)$. Then, given an $\epsilon$, they set $$\xi = \sqrt{\frac{\epsilon}{1+\epsilon}},$$

L to the minimum $\tau_e$ in the graph, and U equal to the maximum variance along any path in G. Finally, they show that it suffices to build distance oracles with edge lengths $l_k = k \cdot \mu_e + \tau_e$ for each $k \in [L(1+\xi)L(1+\xi)^2L, \ldots, U]$, and collected in a set K.

In contrast with prior approaches where all the edge weights distributions are Gaussian, in a UEH only edges weights in tier G are Gaussian. Hence, we build a set K of deterministic EHs for the subset of graph in tier G. We also set $\epsilon$ to a very low value to avoid errors from both Gaussian approximations and the route planning method. Therefore, we get $\xi$ close to 1 and derive L and U empirically from the dataset.

A query for a given risk aversion coefficient c runs like one for Non-dominated routes, except after a Dijkstra's search from s reaches a boundary edge $b_e$, the search in tier G runs a shortest path query on all EHs in set K. The path with minimum $(\mu + c\sqrt{\tau})$ among all shortest path queries is the shortest path in tier G. After the second boundary edge $b_{e'}$ along the search is reached, it progresses to target $t \in V$ by convolving of histograms on the path.

Uncertain Contraction Hierarchies

We also model Uncertain Contraction Hierarchies (UCHs) as two-tiered hierarchies.

Preprocessing

We proceed as with UEHs. First, all vertices are ranked using a standard heuristic. Then, the vertices are contracted in order of rank, and on every $\lambda^{th}$ vertex contracted, we compute the KL divergence (or Hellinger distance) between the edge weight of the shortcut being added and a Gaussian with equal mean and variance. If on contracting $v \in V$, the KLD or HD of all shortcuts being added to the graph is less than $\sigma_T$, we set the threshold $\tau_{min}^G$ to the rank of vertex v.

Query Processing

All three query types can be handled with algorithms similar to those for UEHs, except when building UCHs to minimize the mean-risk objective, we create CHs instead of EHs for the shortcut edges in tier G. As with their deterministic versions, we use stall on demand for UCHs and stall in advance for UEHs.

Other Stable Distributions and Limitations

Our tiering heuristic uses edge weight representations at the lower levels more faithful to real-world data, but approximates with stable distributions at higher tiers, so convolutions are cheaper. However, this heuristic may not be universal. For example, some works use the log-normal and beta distributions as edge weights. Our current heuristic also relies on convergence of edge weight distributions to stable distributions such as Gaussians for longer routes. We find that this works well for travel times, but further work is needed to validate this for more general distributions. Other statistical limit theorems may be helpful for constructing suitable heuristics.

Experiments

To evaluate our methods, we implemented our algorithms in Rust and compiled them with rustc 1.54.0—nightly with full optimizations. All experiments were then run on an Ubuntu Linux machine running kernel 5.4.0 equipped with an Intel i5-8600K 3.6 GHz processor with 1.5 MB of L2 and 9 MB of L3 cache. The machine has 64 GBs of DDR4-2133 Mhz RAM.

Baselines for Deterministic Routing

To evaluate our CH and EH implementations for deterministic edge weights, we compare the preprocessing and query times against reference implementations of Contraction and Edge Hierarchies. We use the CH implementation from the RoutingKit library and the EH made available by the authors. Both reference implementations recommend using the GCC compiler toolchain, so they were compiled with GCC 10.2 with full optimizations.

The graph datasets used are taken from either the $9^{th}$ DIMACS challenge, or an instance of the road network of Los Angeles area taken from Open Street Maps (OSM). The edge

TABLE 1

Description of the graphs used to evaluate our method. Tile 0230123 is a part of the LA area OSM graph between Long Beach and Oxnard, covering most of LA city. We contract all vertices with degree ≤2 for Tile 0230123.

| Graph | Source | Vertices | Edges |
|---|---|---|---|
| New York | DIMACS | 264346 | 733846 |
| Bay Area | DIMACS | 321270 | 800172 |
| California & Nevada | DIMACS | 1890815 | 4657742 |
| USA West | DIMACS | 6262104 | 15248146 |
| Los Angeles Area | OSM | 2549286 | 1666283 |
| Tile 0230123 (contracted) | OSM | 244728 | 453942 | weights in DIMACS instances are pre-populated. For the OSM dataset, we first find the Vincenty's distance between coordinates of adjacent vertices, and divide the distance by the maximum speed allowed on the road type to obtain travel times. Table 1 shows the source and the sizes of the datasets.

Some previous works suggest that CHs outperform EHs significantly. However, their implementation uses adjacency arrays for CH, and adjacency lists for EH, confounding the effects of this difference with possible slowdown factors intrinsic to EHs. Adjacency arrays offer far better locality of reference than adjacency lists when iterating over edges in the graph, making them the preferred representation for routing with deterministic edge weights in fast libraries like RoutingKit. However, for graphs labeled with composite edge weights such as histograms, continuous functions, or both, the benefits of adjacency arrays are less clear. Further, some optimizations, like reordering edges to improve performance, are not well defined for composite edge weights. Therefore, we choose the simpler adjacency lists to implement our algorithms. The effects of this choice are clearly visible in Tables 2 and 3. Our EH implementation has much better preprocessing and query performance than other implementations. This is because our implementation shows better cache utilization. For CHs, our implementation has somewhat better preprocessing times with travel times as edge weights, but worse preprocessing times with the distance metric. The query times of our CH implementation are worse than RoutingKit for both metrics due to the difference in graph representations.

TABLE 2

Deterministic routing: Our CH and EH implementation uses an adjacency list representation for both speedup techniques, and performs better than the original EH implementation but is slower than RoutingKit. The performance gap between CH and EH techniques when using the same underlying graph representation is smaller than previous approaches.

| | | Contraction Hierarchies | | | | | |
|---|---|---|---|---|---|---|---|
| | | Preprocessing (ms) | | | Query (μs) | | |
| | Dataset | RtKt | Ours | % Gain | RtKt | Ours | % Gain |
| Travel Time | New York | 7183 | 7130 | 0.7% | 15 | 23 | −53.3% |
| | Bay Area | 4329 | 4220 | 2.5% | 10 | 15 | −50.0% |
| | States of CA & NV | 28065 | 27297 | 2.7% | 16 | 29 | −81.3% |
| | USA West | 96388 | 90301 | 6.3% | 22 | 51 | −131.8% |
| | Los Angeles Area | 6158 | 5543 | 10.0% | 13 | 20 | −53.8% |
| | Tile 0230123 | 3954 | 4523 | 14.4% | 9 | 16 | −77.8% |
| Distance | New York | 11728 | 12948 | −10.4% | 31 | 45 | −45.2% |
| | Bay Area | 6574 | 6930 | −5.4% | 19 | 27 | −42.1% |
| | States of CA & NV | 46366 | 50537 | −9.0% | 39 | 71 | −82.1% |
| | USA West | 156994 | 167487 | −6.7% | 59 | 108 | −83.1% |
| | Los Angeles Area | 8853 | 9412 | −6.3% | 26 | 44 | −69.2% |
| | Tile 0230123 | 5423 | 8121 | −49.8% | 13 | 22 | −69.2% |

TABLE 3

Deterministic routing: Our CH and EH implementation uses an adjacency list representation for both speedup techniques, and performs better than the original EH implementation but is slower than RoutingKit. The performance gap between CH and EH techniques when using the same underlying graph representation is smaller than previous approaches.

| | | Edge Hierarchies | | | | | |
|---|---|---|---|---|---|---|---|
| | | Preprocessing (ms) | | | Query (μs) | | |
| | Dataset | Ref | Ours | % Gain | Ref | Ours | % Gain |
| Travel Time | New York | 427456 | 285471 | 33.2% | 41 | 35 | 14.6% |
| | Bay Area | 267031 | 241691 | 9.5% | 27 | 22 | 18.5% |
| | States of CA & NV | 1592972 | 1258829 | 21.0% | 46 | 39 | 15.2% |
| | USA West | 4783188 | 3772306 | 21.1% | 62 | 53 | 14.5% |
| | Los Angeles Area | 384892 | 318524 | 17.2% | 33 | 27 | 18.2% |
| | Tile 0230123 | 297123 | 279923 | 5.8% | 26 | 20 | 23.1% |
| Distance | New York | 750250 | 685268 | 8.7% | 82 | 71 | 13.4% |
| | Bay Area | 448575 | 329455 | 26.6% | 52 | 44 | 15.4% |
| | States of CA & NV | 3061041 | 268851 | 91.2% | 117 | 102 | 12.8% |
| | USA West | 9150456 | 7752139 | 15.3% | 186 | 152 | 18.3% |
| | Los Angeles Area | 661573 | 543212 | 17.9% | 72 | 63 | 12.5% |
| | Tile 0230123 | 450032 | 392191 | 12.9% | 43 | 32 | 25.6% |

Stochastic Routing

Our CH and EH implementations are generic, and support both scalar or composite edge weights such as histograms and continuous functions. We benchmark the three kinds of stochastic queries on Tileset 0230123, a subset of the Los Angeles OSM graph.

The travel time distributions are obtained from the Mapbox Traffic Data for Tile ID 0230123, containing the edge travel times sampled at 5-minute intervals. The dataset contains traffic data for four and a half months between 15 Jul. and 30 Nov. 2019, giving us 42,299 travel time updates of the underlying graph edges. These updates were grouped into 30-minute intervals over the 24 hours in a day, then histograms extracted separately for weekdays and weekends. The weekend travel time histograms are much sparser than those for weekdays, and are therefore not used for our experiments. This is because both UCHs and UEHs use histograms to represent edge weights at lower levels of the hierarchy, which are known to be inaccurate when number of observations is low.

To ensure reasonable query processing times, we contracted the vertices in the road network with degree ≤2. This reduces the number of graph vertices and edges significantly, and speeds up the preprocessing and query times without losing accuracy.

Figure 4B:
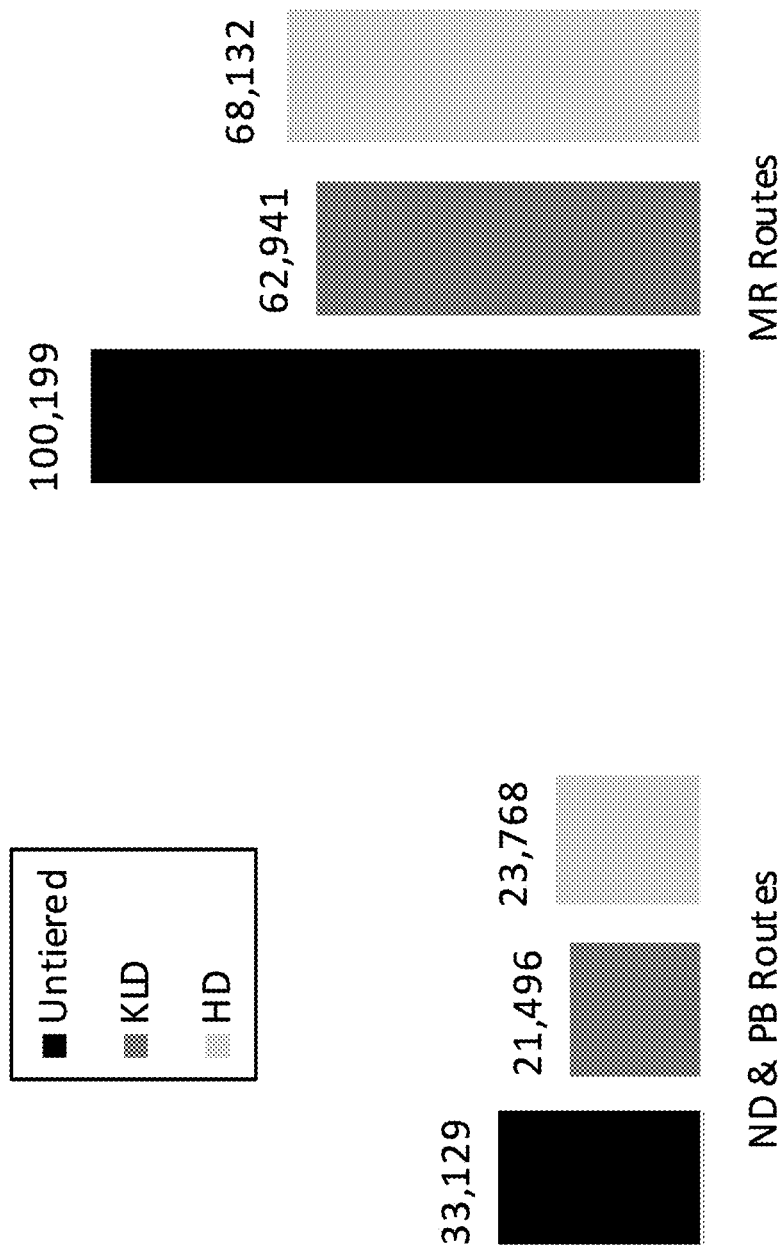

Preprocessing Times: FIGS. 4A-4B shows preprocessing times for all three query types. Specifically, FIG. 4A shows preprocessing times for Uncertain Edge Hierarchies, and FIG. 4B shows preprocessing times for Uncertain Contraction Hierarchies. Non-Dominated Routes and Probabilistic Budget Routes can both be computed using the same underlying graph, so we construct only one UEH and UCH of each type for these query types. The preprocessing times for Mean-risk routes, however, are much larger than for other queries. This is because we must construct a set of EHs or CHs for a subset of the graph to answer mean-risk queries. For all hierarchies, we set $\sigma_T = 0.2$ and $\lambda = 100$.

We see that the untiered hierarchies take the longest to build, followed by the HD and KLD variants of UEH, and the HD and KLD variants of UCH. This is because of the expensive convolutions on histograms. The untiered CH and EH lack tier G which offers cheap convolutions, and incur a high cost for witness searches, increasing preprocessing time. UCH has lower preprocessing time than UEH for the same reasons as in deterministic routing it offers a coarser hierarchy, preprocesses far fewer vertices, and avoids the costly Minimum Vertex Cover computation on each edge contraction.

Figure 5A:
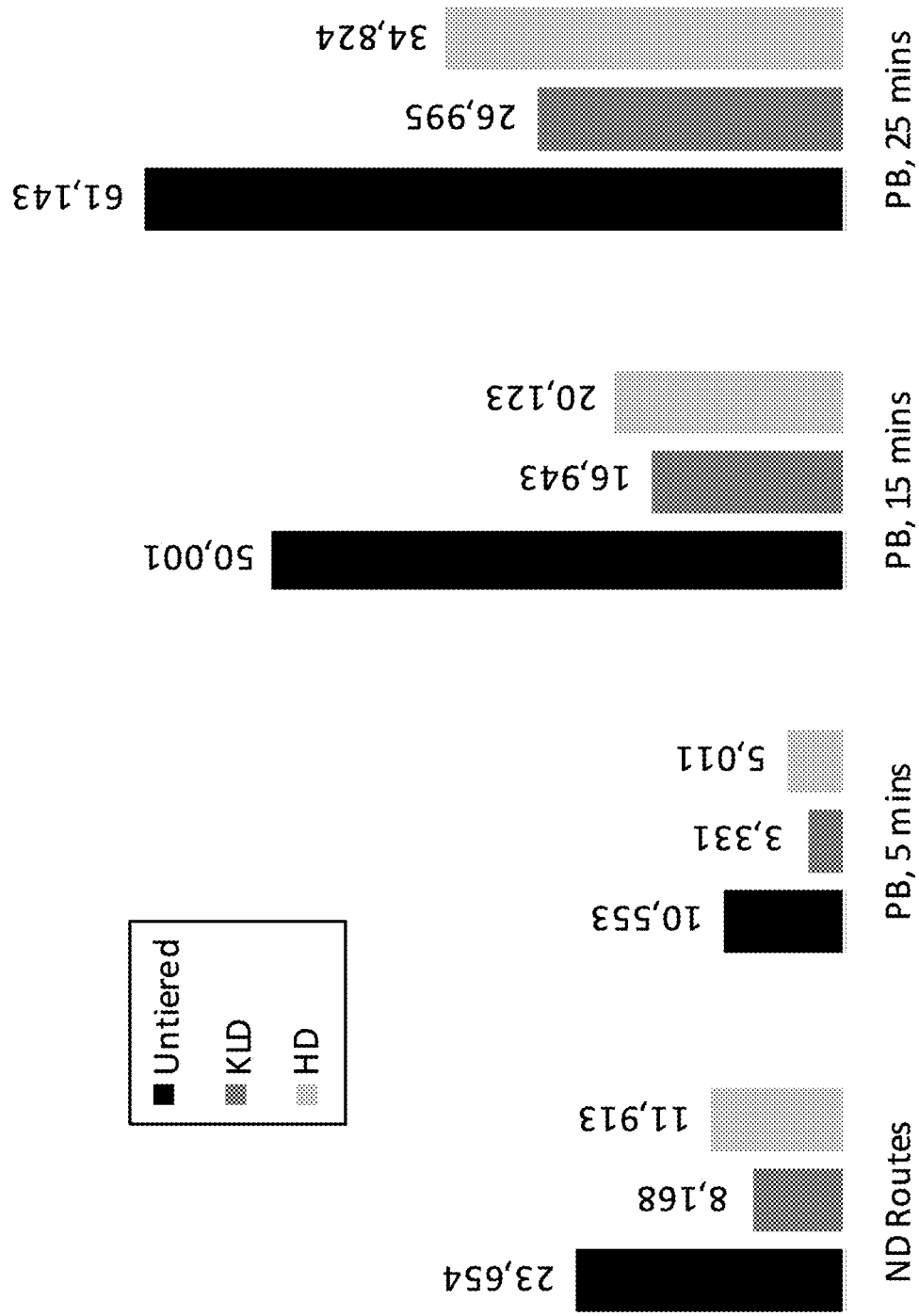
Figure 5B:
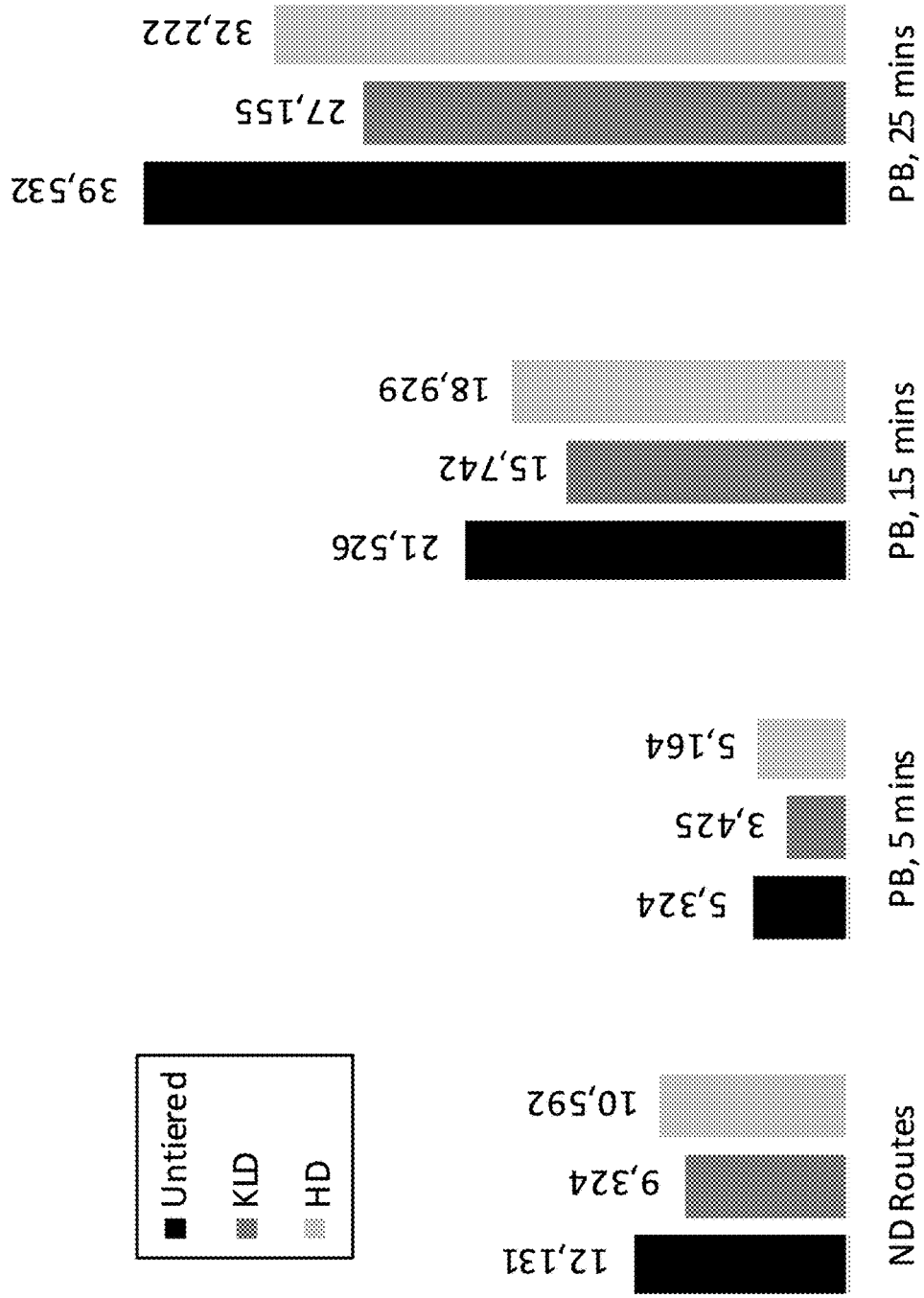
Figure 5C:
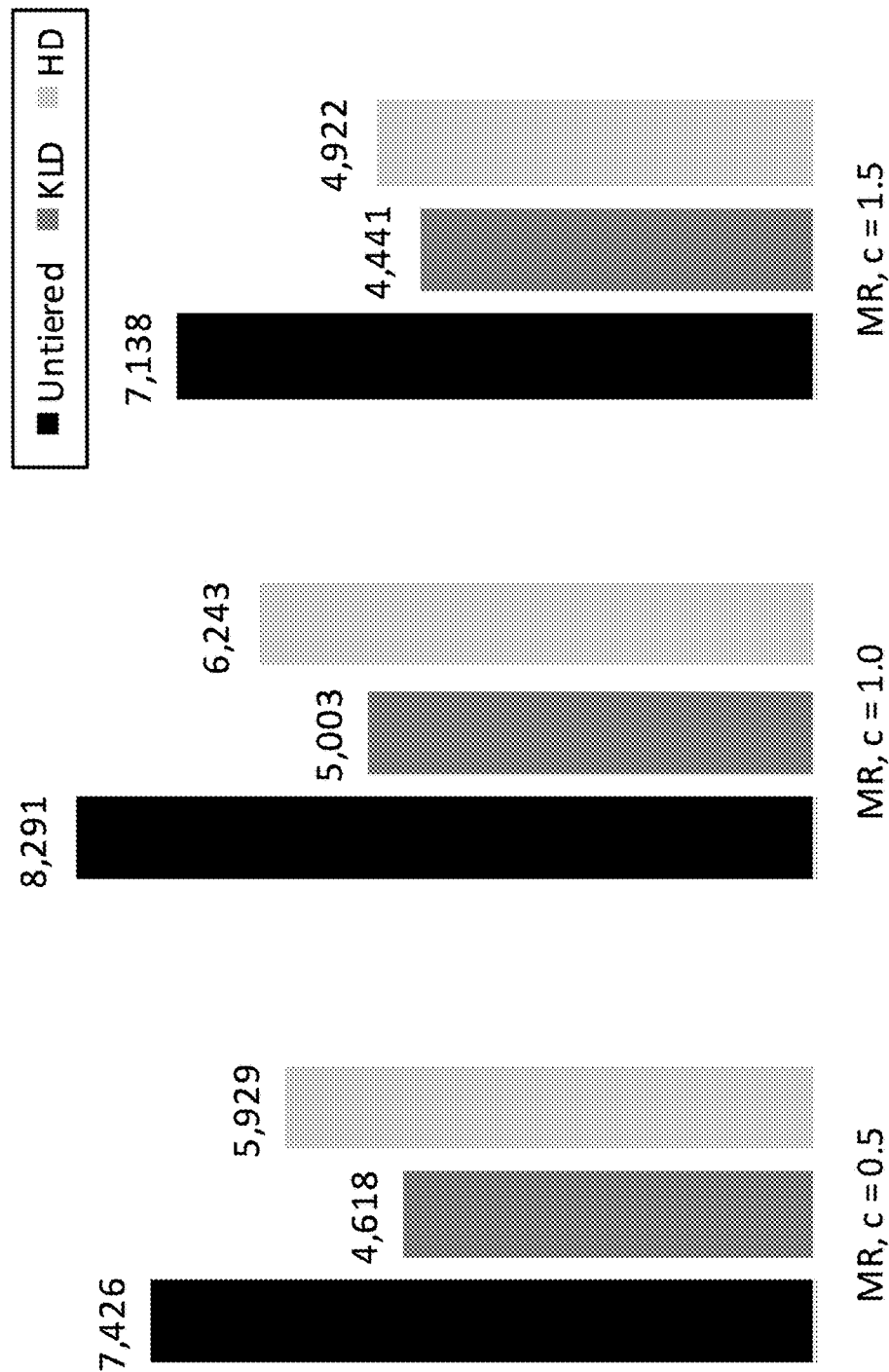

Query times: The query times are shown in FIGS. 5A-5D for all three query types, using the tiered and untiered uncertain CHs and EHs on the contracted road network for Tile 0230123. Specifically, FIG. 5A shows query times for uncertain EHs for Non-Dominated (ND) and Probabilistic Budget (PB) routes with $b \in \{5, 15, 25\}$ minutes. FIG. 5B shows query times for uncertain CHs for Non-dominated (ND) and Probabilistic Budget (PB) routes with $b \in \{5, 15, 25\}$ minutes. FIG. 5C shows query times for uncertain EHs for Mean-risk routes (MR) with $c \in \{0.5, 1.0, 1.5\}$. FIG. 5D shows query times for uncertain CHs for Mean-risk routes (MR) with $c \in \{0.5, 1.0, 1.5\}$.

Routes minimizing the mean-risk objective tend to be the fastest to compute. This is due to having a set of deterministic EHs and CHs for shortcuts in tier G. The very low cost of finding routes in a deterministic hierarchy outweighs having to run K shortest path queries, one for each EH or CH in K. For Probabilistic Budget routes, the query time increases as the budget increases, because the search can reach vertices farther from the source. However, for mean-risk routes, the correlation between c and query times is not well-defined, and can depend on the locations of source and target vertices, variance in edge weights in the vicinity, etc.

Next, we see that for all three query types, untiered hierarchies are the slowest, followed by Bellinger Distance variants of the UEH and UCH. The KLD variants tend to be the fastest. This is due to three reasons: first, HD-UEH and HD-UCH store the Bellinger Distance on each edge of the road graph, and on running queries, include it in the dominance criterion for Dijkstra's labels. In other words, in KLD-UCH or UEH, a Dijkstra's search label at vertex v, $\ell_v$ dominates $\ell_v'$ iff the route represented by $\ell_v$ always takes more time to traverse than one represented by $\ell_v'$. For the HD variants presented, in addition to travel time dominance, $\ell_v$ must have a smaller Bellinger Distance as compared to $\ell_v'$. This makes it harder for a label to dominate another, and fewer searches can be pruned, which results in slower query times.

Effect of approximation error on routes: Since tiered hierarchies approximate edge weight histograms in tier G, they trade off some accuracy for better query processing times. Tables 4 and 5 shows the percentage change in mean travel times for a 100 random stochastic

TABLE 4

Effect of approximation error on route travel times in UEH and UCH. Routes generally take slightly more time when edge weight approximations are used as compared to untiered hierarchies.

| | Uncertain Contraction Hierarchies | | |
|---|---|---|---|
| Change in mean travel times (%) | Untiered | KLD | HD |
| Non-Dominated Routes | 0 | +5.9% | +3.3% |
| Probabilistic Budget Routes | | | |
| b = 5 minutes | 0 | −13.6% | −8.6% |
| b = 15 minutes | 0 | +6.2% | +5.3% |
| b = 25 minutes | 0 | +8.1% | +6.7% |

TABLE 5

Effect of approximation error on route travel times in UEH and UCH. Routes generally take slightly more time when edge weight approximations are used as compared to untiered hierarchies.

| | Uncertain Edge Hierarchies | | |
|---|---|---|---|
| Change in mean travel times (%) | Untiered | KLD | HD |
| Non-Dominated Routes | 0 | +7.1% | +5.4% |
| Probabilistic Budget Routes | | | |
| b = 5 minutes | 0 | +4.6% | +4.7% |
| b = 15 minutes | 0 | +9.5% | +7.7% |
| b = 25 minutes | 0 | +5.9% | +5.9% | routing queries running on untiered versus tiered hierarchies.

In Tables 4 and 5, the travel time generally increases when approximate edge weights are used. This is because our approach to approximating histograms as Gaussians maintains overall fidelity to the histogram, but may cause slight changes to means and variances. Regardless, the errors are well under 10% of the reference solution using untiered hierarchies, except for very short probabilistic budget routes (b=5 minutes).

CONCLUSIONS

Shortest-path queries are much harder when edge weights are stochastic than when they are deterministic, since they must compute expensive convolutions, making them many orders of magnitude slower than deterministic queries. We have addressed this problem by presenting the novel approach of "tiering", which uses different representations for the distributions at different tiers of a shortcut hierarchy, allowing the best representation at each tier.

We have developed Uncertain Contraction Hierarchies (UCH) and Uncertain Edge Hierarchies (UEH), by applying tiering to conventional Contraction and Edge Hierarchies. We have used two tiers in our work in this paper, and shown how to construct these tiers using the KL divergence and the Hellinger distance measures.

We have studied these techniques in depth, and characterized their performance for three important types of stochastic shortest path queries, showing good speedups. We present extensive experiments using real-world instances from Mapbox Traffic Data. Our work has shown that tiering is both practical and useful, and provides good speedups without a significant loss in accuracy. Although the present description focuses on two tiering levels, it is evident that the approach described here generalizes to multiple tiering levels. In addition, various alternative convolution methods between histograms may be used other than the specific examples described above.

An overview of a method for determining a lowest-cost path from a source to a destination according to an embodiment of the invention is shown in FIG. 6. In step 600, a server stores a graph representing possible vehicle paths in a road network, the graph comprising vertices and edges between vertices, where the vertices represent locations in the road network, and wherein the edges represent road segments between the locations. In step 602, a server processes the edges to add a set of shortcut edges that represent paths on the road network comprising a sequence of connected edges. In step 604, the server receives over a communications network and storing edge weights representing travel times for travel along edges of the graph, where the edge weights are represented as probability distributions. In step 606, the edges are partitioned into multiple tiers, wherein a first tier has a first set of edges such that convolutions of probability distributions of the first set of edges can be feasibly replaced with functional approximations, and wherein a second tier has a second set of edges such that convolutions of probability distributions of the second set of edges can not be feasibly replaced with functional approximations. In step 608, the server receives over the communication network a vehicle origin and a vehicle destination and other relevant vehicle parameters. In step 610, the server performs a Dijkstra search of the graph from the vehicle origin to the vehicle destination, wherein the Dijkstra search computes, for vertices along a path, convolutions of distributions and sums of functional approximations. In step 612, the server returns over the communication network paths from the source to the destination produced by the Dijkstra search.

Figure 7:
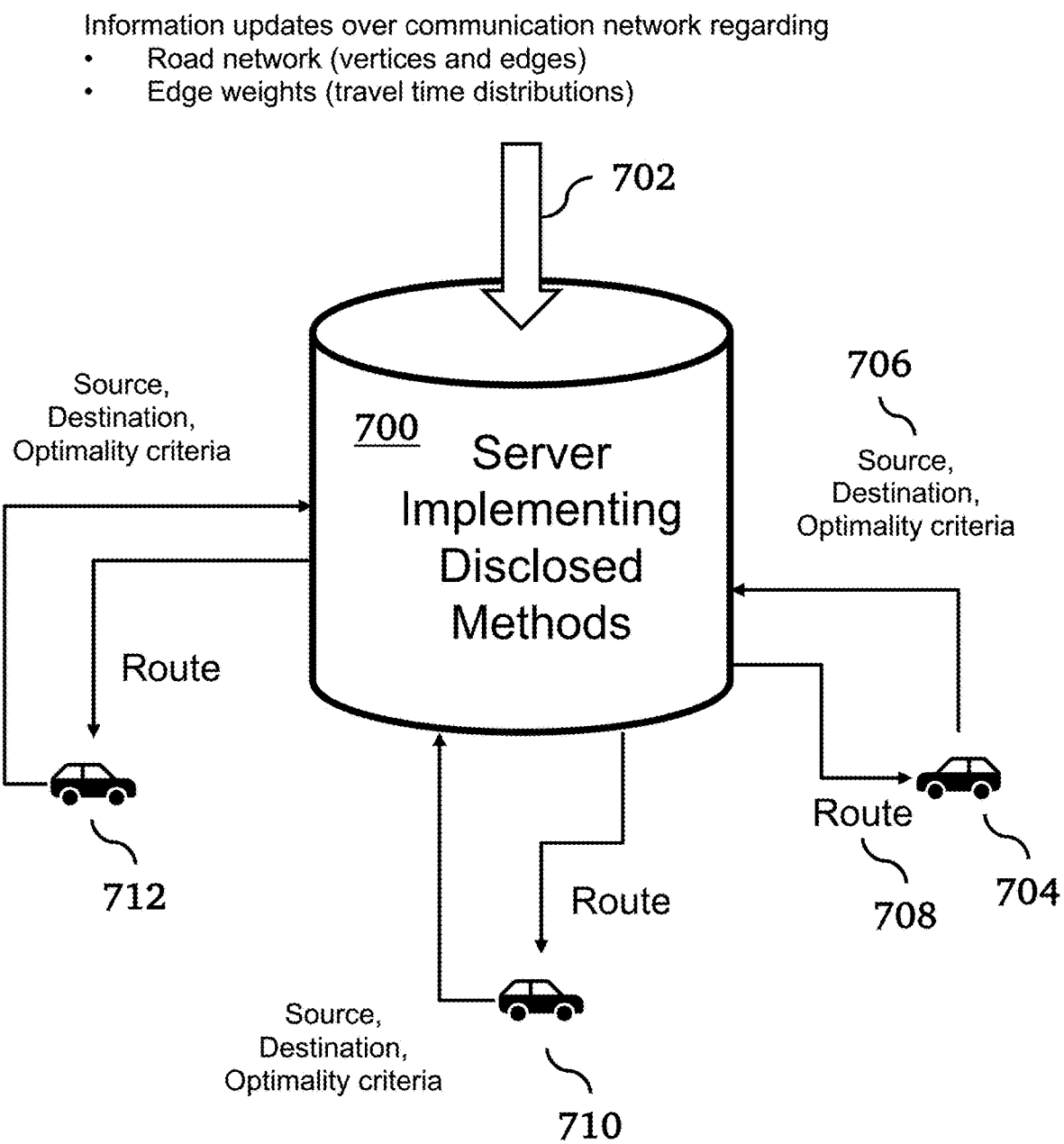
FIG. 7 is a schematic diagram of a system implementing a method for determining a vehicle route through a road network from a source to a destination, according to an embodiment of the invention.

FIG. 7 is a schematic diagram of a system implementing a method for determining a vehicle route through a road network from a source to a destination, according to an embodiment of the invention. The system includes a server 700 which may include one or more computers networked with each other, and vehicles 704, 710, 712, which communicate with the server 700 over a data communications network which typically would include a combination of wireless and wired data communication networks. It is understood that the vehicles may be devices, such as a mobile phone located within a vehicle. The server 700 receives information updates 702 over a data network regarding the road network topology (vertices and edges), edge weights (travel time distributions), and possibly other information such as traffic and weather conditions. A vehicle 704 requesting routing sends to the server 700 information including vehicle source and vehicle destination. After the server determines route(s) for the vehicle, this routing information is sent from the server 700 to the vehicle 704, which then uses the information to guide the human driver or autonomous driving system along the route.

The invention claimed is:

1. A vehicle routing method comprising:
    storing, at a server that is communicatively coupled with one or more vehicles via a wireless communication network, a graph representing a road network, the graph comprising vertices and edges between vertices, where the vertices represent locations in the road network, and wherein the edges represent road segments between the locations;
    augmenting, at the server, the graph representing the road network by adding shortcut edges to the edges, wherein the shortcut edges represent paths comprising a sequence of connected edges in the graph representing the road network;
    receiving and storing edge weights representing travel times for travel along edges of the graph, where the edge weights are represented as probability distributions;
    partitioning the edges of the augmented graph into multiple tiers including an upper tier and a lower tier, wherein the upper tier has a first set of edges whose weights are specified as stable distributions and/or wherein convolutions of probability distributions of the first set of edges can be feasibly replaced with functional approximations, and wherein the lower tier has a second set of edges wherein convolutions of probability distributions of the second set of edges cannot be feasibly replaced with functional approximations;
    receiving, a routing request from a vehicle of the one or more vehicles over the wireless communication network, wherein the routing request includes a vehicle origin and a vehicle destination of the vehicle;
    performing a Dijkstra search on the augmented graph from the vehicle origin to the vehicle destination, wherein the Dijkstra search computes convolutions of distributions and sums of functional approximations for paths being computed; and
    returning, over the wireless communication network, routing information to the vehicle destination produced by the Dijkstra search, wherein the routing information is configured to guide a human driver or an autonomous driving system.

2. The method of claim 1 wherein partitioning the edges into multiple tiers comprises ranking the shortcut edges, and partitioning the edges based on the ranking.

3. The method of claim 1 wherein the multiple tiers comprise a tier having edge weights that are stable distributions.

4. The method of claim 3 wherein the multiple tiers comprise a tier having edge weights that are Gaussian distributions.

5. The method of claim 1 wherein the multiple tiers comprises a tier having edge weights that are non-stable distributions.

6. The method of claim 5 wherein the multiple tiers comprises a tier having edge weights that are histograms.

7. The method of claim 1 wherein partitioning the edges of the augmented graph into multiple tiers comprises performing statistical tests to determine whether a functional approximation in terms of a stable distribution is feasible for an edge weight, and of aggregating stable distributions for paths, including shortcut paths, during shortest path computation.

8. The method of claim 1 wherein the paths comprise a path maximizing a probability of reaching the destination before a deadline.

9. The method of claim 1 wherein the paths comprise a path minimizing a linear combination of a mean and variance of travel times on edges.

10. The method of claim 1 wherein the paths comprise a path that has cost distributions not stochastically dominated by other routes in the network.

11. A server comprising at least one processor and a memory, wherein the server is configured to perform a method comprising:
    storing, at the server, a graph representing a road network, the graph comprising vertices and edges between vertices, where the vertices represent locations in the road network, and wherein the edges represent road segments between the locations, wherein the server is configured to communicatively couple with one or more vehicles via a wireless communication network;

augmenting, at the server, the graph representing the road network by adding shortcut edges to the edges, wherein the shortcut edges represent paths comprising a sequence of connected edges in the graph representing the road network;

receiving, at the server, over a communications network and storing edge weights representing travel times for travel along edges of the graph, where the edge weights are represented as probability distributions;

partitioning the edges of the augmented graph into multiple tiers including an upper tier and a lower tier, wherein the upper tier has a first set of edges whose weights are specified as stable distributions and/or wherein convolutions of probability distributions of the first set of edges can be feasibly replaced with functional approximations, and wherein the lower tier has a second set of edges wherein convolutions of probability distributions of the second set of edges cannot be feasibly replaced with functional approximations;

receiving, a routing request from a vehicle of the one or more vehicles over the communication network, wherein the routing request includes a vehicle origin and a vehicle destination of the vehicle;

performing a Dijkstra search on the augmented graph from the vehicle origin to the vehicle destination, wherein the Dijkstra search computes convolutions of distributions and sums of functional approximations for paths being computed; and returning, over the wireless communication network, routing information to the vehicle destination produced by the Dijkstra search, wherein the routing information is used for guiding a human driver or an autonomous driving system.

12. The method of claim 1, wherein each tier of the multiple tiers represents a set of shortcut edges having ranks greater than or equal to a first threshold and less than or equal to a second threshold.

13. The method of claim 12, wherein the multiple tiers include a histogram tier in which a histogram is used to represent edge weights and a Gaussian tier in which a probability distribution is used to represent edge weights.

14. The method of claim 13, wherein the first threshold and the second threshold for the Gaussian tier and the histogram tier are determined by sampling the edges by a factor 2, and by determining a KL divergence or a Hellinger distribution of edge weights.

15. The server of claim 11, wherein the partitioning the edges into multiple tiers comprises ranking the shortcut edges, and partitioning the edges based on the ranking.

16. The server of claim 11, wherein the multiple tiers comprise at least one of: a tier having edge weights that are stable distributions, a tier having edge weights that are Gaussian distributions, a tier having edge weights that are non-stable distributions, or a tier having edge weights that are histograms.

17. The server of claim 11, wherein the partitioning the edges of the augmented graph into multiple tiers comprises performing statistical tests to determine whether a functional approximation in terms of a stable distribution is feasible for an edge weight, and of aggregating stable distributions for paths, including shortcut paths, during shortest path computation.

18. The server of claim 11, wherein the paths comprise a path maximizing a probability of reaching the destination before a deadline.

19. The server of claim 11, wherein the paths comprise a path minimizing a linear combination of a mean and variance of travel times on edges.

20. The server of claim 11, wherein each tier of the multiple tiers represents a set of shortcut edges having ranks greater than or equal to a first threshold and less than or equal to a second threshold, and wherein the multiple tiers include a histogram tier in which a histogram is used to represent edge weights and a Gaussian tier in which a probability distribution is used to represent edge weights.

* * * * *